United States Patent [19]
Coutts et al.

[11] Patent Number: 5,608,828
[45] Date of Patent: Mar. 4, 1997

[54] FIBER OPTIC CONNECTOR APPARATUS

[75] Inventors: Bruce Coutts, Costa Mesa; Christopher A. Roe, Tustin, both of Calif.

[73] Assignee: ITT Corporation, New York, N.Y.

[21] Appl. No.: 527,267

[22] Filed: Sep. 12, 1995

[51] Int. Cl.⁶ .................................................. G02B 6/38
[52] U.S. Cl. ............................. 385/59; 385/60; 385/72
[58] Field of Search .............................. 385/55, 56, 58, 385/59, 60, 66, 70, 71, 72, 77, 78, 84

[56] References Cited

U.S. PATENT DOCUMENTS

| | | | |
|---|---|---|---|
| 4,140,366 | 2/1979 | Makuch et al. | 385/59 |
| 4,140,367 | 2/1979 | Makuch et al. | 385/59 |
| 4,205,897 | 6/1980 | Stankos . | |
| 4,279,466 | 7/1981 | Makuch . | |
| 4,699,458 | 10/1987 | Ohtsuki et al. | 385/59 |
| 4,737,009 | 4/1988 | Kakii et al. | 385/59 |
| 4,759,599 | 7/1988 | Yamaguchi et al. | 385/59 |
| 5,050,956 | 9/1991 | Carpenter . | |
| 5,073,042 | 12/1991 | Mulholland . | |
| 5,121,454 | 6/1992 | Iwano et al. | 385/59 |
| 5,187,768 | 2/1993 | Ott et al. | 385/72 |
| 5,253,316 | 10/1993 | Shibutani . | |
| 5,263,106 | 11/1993 | Rosson | 385/72 |
| 5,265,182 | 11/1993 | Hartley | 385/59 |
| 5,274,729 | 12/1993 | King et al. | 385/59 |
| 5,283,848 | 2/1994 | Abendschein et al. | 385/59 |
| 5,404,416 | 4/1995 | Iwano et al. | 385/60 |
| 5,416,867 | 5/1995 | Thorsten et al. | 385/72 |
| 5,432,879 | 7/1995 | Lee | 385/60 |
| 5,446,817 | 8/1995 | Kardos et al. | 385/72 |

*Primary Examiner*—Rodney B. Bovernick
*Assistant Examiner*—Robert E. Wise
*Attorney, Agent, or Firm*—Thomas L. Peterson

[57] ABSTRACT

A fiber optic connector is described which has an alignment sleeve (70, FIG. 3) for surrounding fiber-holding ferrules (44, 68), wherein the sleeve can deflect to receive a slightly misaligned mating ferrule and wherein the assembly can be readily removed for cleaning. The sleeve is expandable in diameter and is contained in a hood (80) that surrounds the sleeve and that forms front and rear shoulders (82, 84). The hood loosely surrounds the sleeve and the hood is loosely contained in a connector housing passage (34), to facilitate reception of a slightly misaligned mating ferrule. A hood alignment sleeve assembly includes a front body (50) and a rear retention sleeve, or body, with a spring (56) spanning them, the front body being attached to the hood, and the hood shifting forward and rearward with the sleeve. The hood includes a front hood piece (152) forming the front sleeve-abutting shoulder and a rear hood piece (154) forming the rear shoulder. The rear hood piece is threadably connected (at 156) to the front body, and the front hood piece is slidably mated to the rear hood piece. The alignment assembly can be removed from the connector passage, the rear hood piece unthreaded from the front body, and the front hood piece slid forwardly out of contact with the rear hood piece, to gain access to the sleeve for cleaning.

17 Claims, 4 Drawing Sheets

FIBER OPTIC CONNECTOR APPARATUS

BACKGROUND OF THE INVENTION

A pair of optical fibers are often connected by installing each fiber in a hole in a precision ferrule, and positioning the ferrules in alignment with their tips abutting. A first or socket ferrule lies in the rear half of an alignment sleeve of a socket connector. A pin connector is mated to the socket connector by projecting the pin ferrule into the sleeve until the tips of the ferrules abut, the socket ferrule being spring biased forwardly so it can deflect rearwardly. Although the sleeve must hold the two ferrules precisely concentric when possible, it is desirable if the sleeve can receive a pin ferrule that is slightly misaligned with the socket ferrule. The sleeve must remain in the socket housing when the connectors unmate and the pin ferrule is removed, and yet it is desirable if the sleeve, or a hood that surrounds the sleeve, can be readily removed for access to the ferrule and fiber front faces, for cleaning and polishing of the ferrule, and for cleaning or replacement of the sleeve and hood.

SUMMARY OF THE INVENTION

In accordance with one embodiment of the present invention, a fiber optic connector apparatus is provided which enables reception of a pin ferrule that is initially slightly misaligned with a socket ferrule lying in a reception sleeve, and which facilitates removal of the sleeve or a hood that surrounds the sleeve. The socket connector includes a housing with a passage and an alignment assembly lying in the passage. The alignment assembly includes a ferrule-receiving sleeve that is expandable in diameter, and a hood with a tubular portion that surrounds the sleeve and with front and rear shoulders that limit forward and rearward movement of the sleeve. The hood loosely surrounds the sleeve, or at least the sleeve front portion, and the hood and sleeve are slidable together along the passage. A spring extends between a rear body that is fixed in the passage and a front body that can slide forward and rearward and that is attached to the hood.

The hood includes a front hood piece forming the front shoulder and a rear hood piece forming the rear shoulder. The hood rear piece is removably fastened to the front body, as by a threadable connection. The hood front piece is slidably engaged with the hood rear piece. The entire terminus assembly can be removed from the housing, the hood rear piece unscrewed from the front body, and the hood front piece slid off of the hood rear piece to expose the sleeve and the hood pieces for cleaning.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
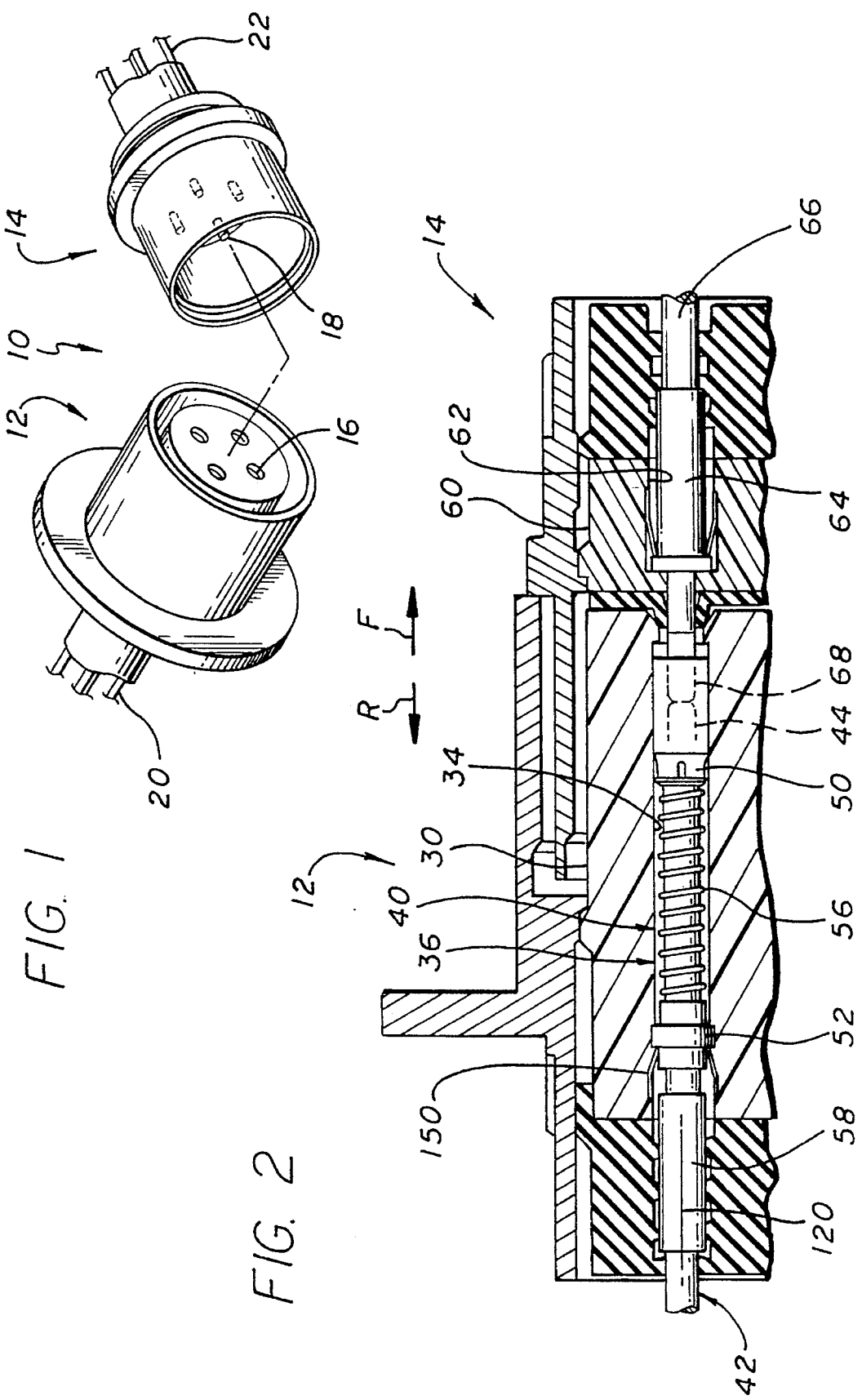
FIG. 1 is an exploded isometric view of a fiber optic connector apparatus constructed in accordance with the invention, showing the socket and pin connectors unmated.
FIG. 2 is a partial sectional view of the apparatus of FIG. 1, with the connectors fully mated.

FIG. 1 illustrates a fiber optic connector apparatus 10 which includes a socket connector 12 and a pin connector 14. The socket connector is referred to as a socket type because it has socket portions 16 that are designed to receive pin portions 18 of the pin connector, with four of each being indicated. Some designs include only a single channel (one socket portion 16 and one pin portion 18). Each connector has a bundle of fiber optic cables 20, 22 extending therefrom, and the purpose of the connectors is to connect fibers of the cables so light can pass between corresponding cables that are coupled to the two connectors.

FIG. 2 is a sectional view of the apparatus of FIG. 1, with the connectors 12, 14 fully mated. The socket connector 12 includes a housing 30 with at least one passage (four being indicated) and a terminus assembly, or socket terminus 36 lying in the passage. The socket terminus 36 includes an alignment assembly 40 and a cable assembly 42, the cable assembly including a ferrule 44 attached to an optical fiber of the cable. The alignment assembly includes front and rear socket bodies 50, 52 and a compression coil spring 56 that spans the distance between the bodies and biases them apart. A rigid sleeve 58 slidably extends through the rear body 52 and is attached to the from body, to protect the cable assembly as it slides slightly with the front body. The pin connector 14 includes a pin housing 60 with a passage 62, a pin body 64 lying in the passage, and a pin cable assembly 66 that includes a pin ferrule 68 that abuts the socket ferrule 44.

Figure 3:
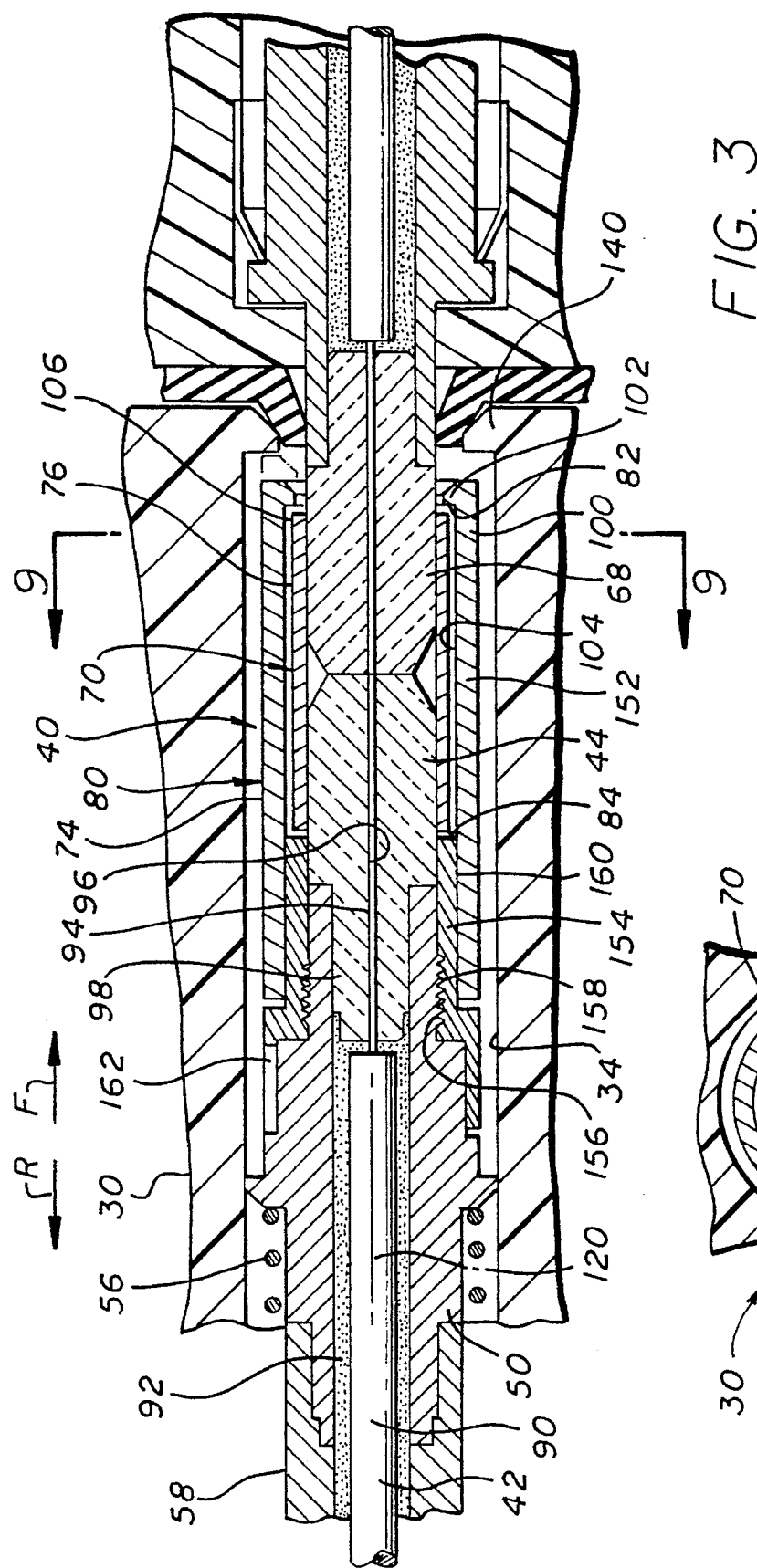
FIG. 3 is a sectional view of a portion of the apparatus of FIG. 2.
Figure 9:
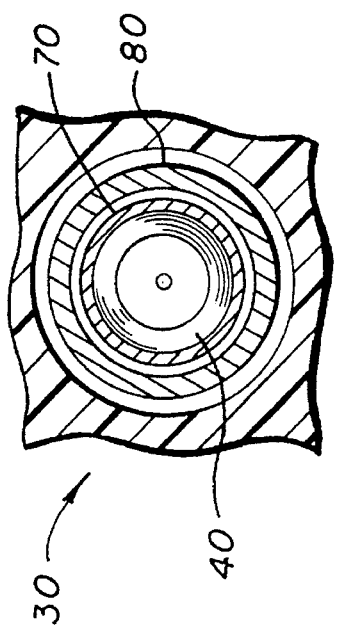
FIG. 9 is a view taken on line 9—9 of FIG. 3.
Figure 4:
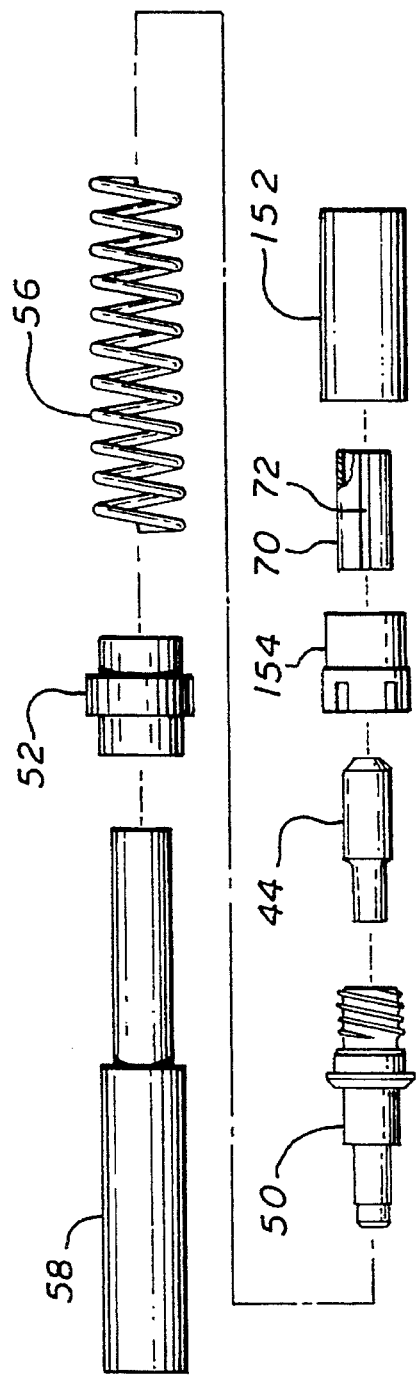
FIG. 4 is an exploded side elevation view of the alignment assembly of the apparatus of FIG. 3.

FIG. 3 shows some details of the alignment assembly 40 which serves to align the socket and pin ferrules 44, 68. The alignment assembly includes a ferrule-receiving alignment sleeve 70 of a type that at least a front portion 76 that is expandable in diameter. As indicated in FIG. 4, the alignment sleeve 70 is preferably formed of sheet metal rolled into a cylindrical shape, with a gap 72 that permits expansion. It is also possible to machine it (although at a much higher cost). The sleeve has a rear portion 74 (FIG. 3) that closely surrounds the socket ferrule 44, and has a front or forward portion 76 that is designed to closely surround the pin ferrule 68. The alignment assembly also includes a hood assembly or hood 80 that surrounds the sleeve and that forms front and rear shoulders 82, 84 to limit forward and rearward movement of the sleeve 70 with respect to the hood 80. The hood is mounted on the front body 50, which is biased forwardly by the spring 56. It is noted that the cable assembly 42 includes a buffered cable portion 90 that is fixed in the front body as by epoxy 92, and a thin fiber 94 lying in a narrow conduit 96 of the socket ferrule 44 and fixed in position thereat as by a small amount of the epoxy. The rear portion 98 of the ferrule 44 is fixed to the front body in an interference fit and is also bonded to the front body by the epoxy 92.

It would be possible to place the alignment sleeve 70 within a narrower housing passage 34, without a hood surrounding the sleeve. In that case, the walls of the housing passage 34 would serve as a hood to avoid loss of the sleeve when the ferrules are unmated. However, by providing a separate hood 80 around the sleeve, applicant is able to provide a more precisely manufactured hood with precise dimensions to control float and position and prevent sleeve loss. While the housing 30 is preferably formed of molded plastic, the hood 80 is a small machined pad, that can be readily manufactured with higher precision than the walls of the passage. The hood also serves to couple the alignment sleeve to the spring 56 that biases the sleeve forwardly, in the direction F, while allowing the sleeve to deflect rearwardly in the direction R.

Figure 5:
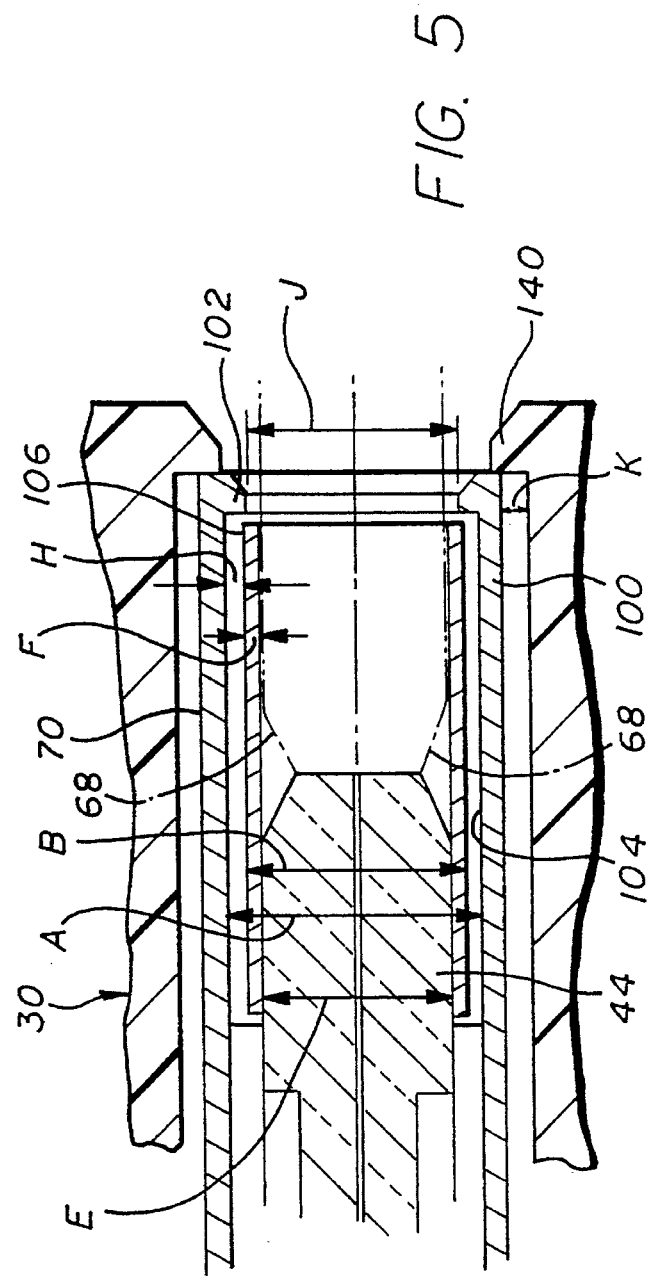
FIG. 5 is a sectional view of a portion of the apparatus of FIG. 3.
Figure 6:
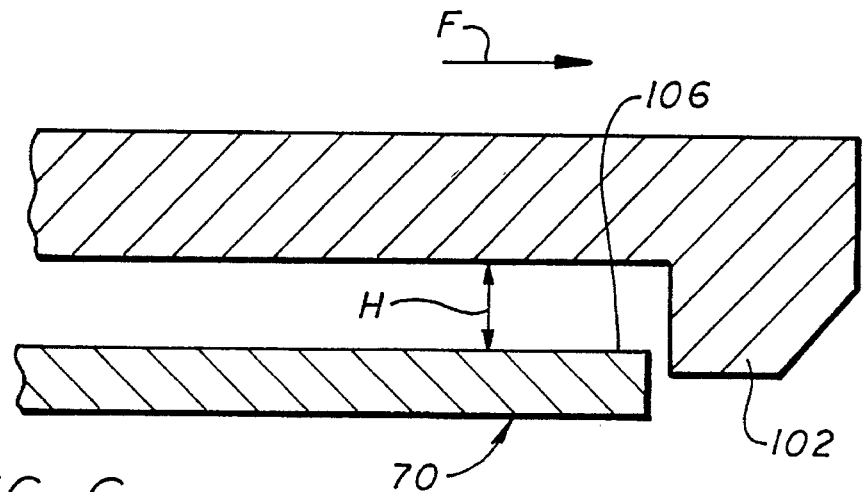
FIG. 6 is an enlarged view of a portion of the alignment assembly of FIG. 3.
Figure 7:
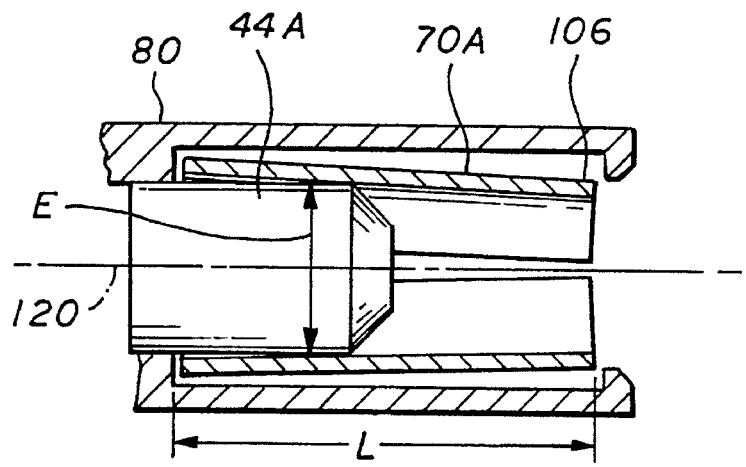
FIG. 7 is a sectional view of a portion of the alignment assembly of FIG. 3, prior to reception of a pin terminal in the socket connector.

The hood 80 includes a tubular portion 100 that surrounds the sleeve, and an inwardly-extending flange 102 at the front end of the hood, which forms the front shoulder 82. As shown in FIG. 5, the inside surface 104 of the tubular portion is of a considerably greater diameter A than the outside diameter B of the sleeve when it closely surrounds the two ferrules. The advantage of such looseness, is that it enables the sleeve front end 106 to tilt slightly to engage a pin ferrule 68 that is not precisely aligned with the socket ferrule 44. FIG. 7 shows a portion of the socket connector with the socket ferrule at 44A fully installed, but prior to installation of the pin ferrule. The sleeve at 70A is positioned with its front end 106 of slightly smaller diameter than after the pin ferrule is installed. There is a slight danger that the sleeve 70A could be pulled forwardly out of the hood 80. However, there are no forces tending to pull out the sleeve (until the ferrules are unmated), and the sleeve tends to remain in place under frictional contact with the socket ferrule 44A.

FIG. 5 shows the sleeve 70 fully expanded as a result of full insertion of the pin ferrule 68. When the pin ferrule 68 is pulled in the forward direction F to unmate the connectors, it tends to also pull out the sleeve 70. However, the hood flange 102 then abuts the sleeve front end to prevent such pull out.

Figure 8:
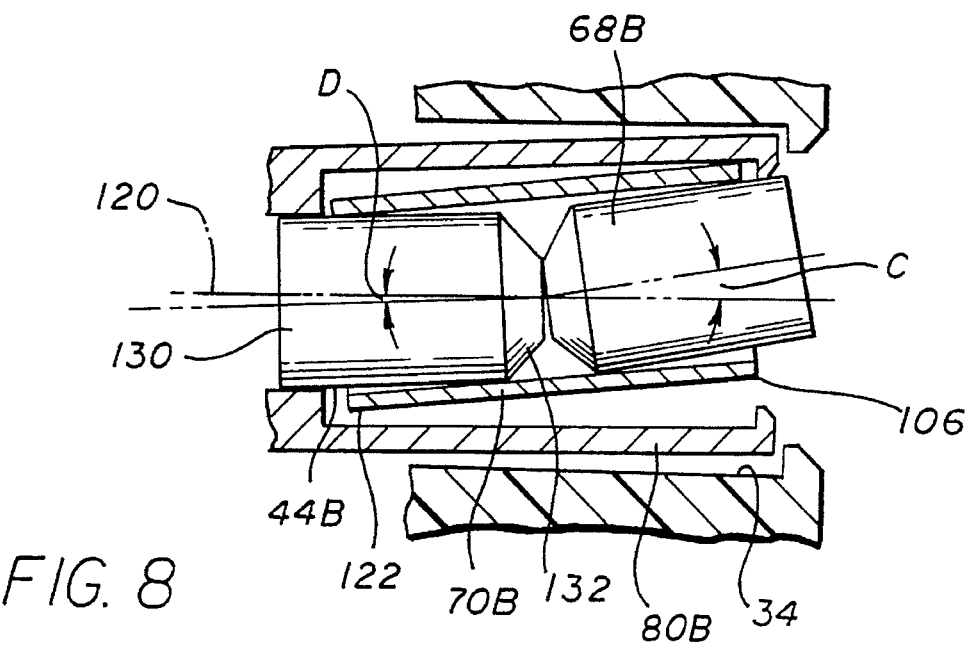
FIG. 8 is a view similar to that of FIG. 7, but showing a highly misaligned pin ferrule received in the socket connector.

FIG. 8 shows a pin ferrule 68B that has been installed in considerable misalignment with the socket ferrule 44B (at a tilt angle C). The looseness with which the sleeve 70B is held within the hood 80B, permits considerably tilt of the sleeve to receive the misaligned pin ferrule. It is noted that the hood 80B is loosely held within the housing passage 34, so the hood can also tilt to accommodate the ferrule misalignment. Tilt of the hood permits corresponding tilt of the socket ferrule 44B (to tilt angle D), to permit precise alignment with a slightly misaligned pin terminal. A greatly misaligned pin terminal results in a situation such as shown in FIG. 8, where the fully installed pin ferrule is misaligned. It is still possible for light to be carried from one ferrule to the other, although considerable losses can be expected.

Applicant prefers that the sleeve 80 have a minimal length L (FIG. 7) while still assuring that it can engage considerable lengths of the two ferrules to precisely align them (unless one of the ferrules is forced into a misaligned orientation. A longer length for the sleeve will result in it encircling a longer length of each ferrule. However, a longer length for the sleeve will result in larger axial movement of the front and rear ends of the sleeve in case of misalignment, as shown in FIG. 8. That is, the radial distance, with respect to the passage axis 120 that the front and rear ends 106, 122 of the sleeve will move for a given angular misalignment C of the pin terminal with the socket passage, depends upon the length of the sleeve. Applicant prefers a length L for the sleeve which is less than about three times the outside diameter B of the sleeve, more preferably a length that is no more than 2.5 times the outside diameter. This allows the sleeve to surround a length of each ferrule cylindrical portion 130 that is about equal to the diameter E of the cylindrical portion, and to also surround the tapered front ends 132 of the ferrules.

In a connector that applicant has designed, the ferrules each have an outside diameter E (FIG. 5) of 62.5 mils (1 mil equals one thousandth inch). The sleeve 70 is formed of stainless steel having a thickness F of 5 mils, so the sleeve outside diameter B is 72.5 mils when surrounding two precisely aligned ferrules. The hood tubular portion 100 has an inside diameter A of 86.5 mils, to leave a clearance H of 7 mils between the sleeve outside and the hood inside. The hood flange 102 has an inside diameter J of 68.5 mils. The flange 102 prevents forward movement of the sleeve out of the passage. The connector housing 30 has a front end with a housing flange 140 that prevents pullout of the hood, with the housing passage loosely surrounding the hood (a clearance K of about 10 mils) to permit tilt of the hood. The sleeve can tilt by at least 4° with respect to the hood. The sleeve has a length of 153 mils.

As indicated in FIG. 2, the rear socket body 52 is held in the housing by a retainer clip 150. A tool of the type commonly used for electrical connectors, can be inserted forwardly through the rear of the connector housing, to expand the clip and permit rearward pullout of the socket terminus, including the front socket body 50 and hood by merely pulling on the optical cable. As shown in FIG. 3, the hood 80 includes front and rear hood pieces 152, 154. The rear hood piece 154 has an internal thread 156 that screws onto an external thread 158 on the front body 50. This allows removal of the hood from the front body, while still assuring that the hood is rigidly connected to the front body so the hood cannot tilt relative to the front body. A connection that allowed hood tilt would allow the hood to initially lie against one side of the passage front portion and increase maximum misalignment. While applicant prefers a threaded connection, it is instead possible to have precision slidably-engaged surfaces on the hood and body to allow separation while preventing hood tilt, and with tines with hooks at their ends to prevent separation until the tines are lifted. Upon separation of the hood and the front body, the fiber and ferrule are exposed for cleaning and/or polishing, while the hood and sleeve are detached from the ferrule and can be cleaned or replaced.

The hood front piece 152 lies in an interference fit at an interface 160 with the hood rear piece. Instead, a sliding fit at interface 160 can be provided so the hood pieces can be separated by sliding them apart. Any slidable engagement of the front and rear hood pieces does not affect operation of the device, since in practice the hood is pushed forwardly by the spring, which urges full sliding engagement of the hood pieces. Even if the front hood part should slide forwardly with respect to the rear hood piece, such forward sliding is stopped by the housing front flange 140.

The threadable connection at 156, 158 allows the hood 80 and sleeve 70 therein to be detached from the front body 50, and from the ferrule 44 and optical fiber 94 that are joined to the front body. Even if the unthreaded hood 80 is not disassembled, the unthreading facilitates cleaning of the inside of the hood and sleeve or its replacement, and repolishing and/or cleaning of the fiber tip. Reassembly is easily accomplished by screwing the hood back onto the front body.

As shown in FIG. 3, applicant prefers to form the rear hood piece 154 with a plurality of tines 162 that press against the outside of the front body 50. The tines 162 resist relative turning of the rear hood piece and front body, which could unthread them. However, they can be unthreaded by forcefully turning one of them. The tines are thin and do not hamper rearward pullout of the alignment assembly.

It is possible to use a one-piece hood 80 in which case the sleeve 70 can be removed by a special tool that collapses it. It is possible to place a spring on the pin connector to bias a pin ferrule, in which case a single body can be used in place of the slidably-engaged front and rear bodies 50, 52. Such a single body can be permanently fixed in the housing, with the hood being removable by unscrewing it and pulling it forwardly out of the housing. It is possible for the front end of the hood to project slightly from the housing 30, to enter a housing of a mating connector. Where only a single channel is required, it is possible to not have a housing 30.

Thus, the invention provides a fiber optic connector apparatus which facilitates reception of a slightly misaligned pin ferrule and which facilitates disassembly for cleaning. An alignment sleeve which holds the socket and pin ferrules in precise alignment, has at least a front portion that is expandable, so it can receive a slightly misaligned pin ferrule. The sleeve is loosely held within a hood, to also facilitate slight tilt of the sleeve. The hood has shoulders that can abut the front and rear ends of the sleeve to limit axial sleeve movement, and the hood and sleeve slide substantially together in forward and rearward directions, and are biased forwardly by a spring. The hood itself is preferably loosely held within a housing passage. The hood is attached to the front body as by a threadably connection that resists loosening, by tines. The hood has front and rear hood pieces that are slidably engaged so the hood can be readily disassembled to release the sleeve.

Although particular embodiments of the invention have been described and illustrated herein, it is recognized that modifications and variations may readily occur to those skilled in the art, and consequently, it is intended that the claims be interpreted to cover such modfifications and equivalents.

What is claimed is:

1. Fiber optic connector apparatus comprising:

a housing having at least one passage with an axis and with front and rear passage portions;

a socket terminus that includes an alignment assembly lying primarily in said passage;

said alignment assembly including a ferrule-receiving sleeve which has a rear portion for holding a first ferrule and a front portion that is expandable in diameter to receive a mating second ferrule, said alignment assembly including a hood that surrounds said sleeve and that forms front and rear shoulders that limit forward and rearward movement of the sleeve with respect to the hood;

said hood and said sleeve therein being slidable together along said axis, and said socket terminus including a spring that forwardly biases said hood.

2. The apparatus described in claim 1 wherein;

said alignment assembly includes front and rear bodies with said spring extending between said bodies and with said front body being slidable along said passage;

said hood includes a front hood piece forming said front shoulder and a rear hood piece forming said rear shoulder, said rear hood piece being removably fastened to said front body and said front hood piece being slidably engaged with said rear hood piece.

3. The apparatus described in claim 2 wherein;

said rear hood piece is threadably connected to said front body, said front body having a largely cylindrical surface, and said rear hood piece having a plurality of deflectable tines that press against said cylindrical surface to resist relative rotation of said front body and said rear hood piece.

4. The apparatus in claim 1 wherein:

said hood loosely surrounds said sleeve front portion to allow sleeve tilt by at least 4° with respect to said hood when both of said ferrules installed in said sleeve.

5. The apparatus described in claim 1 wherein said socket terminus includes a first ferrule of predetermined diameter lying in said sleeve rearward portion, said sleeve forward portion being designed to receive a second ferrule of substantially the same diameter as said first ferrule, and wherein;

said sleeve has a front end with inner and outer surfaces that respectively have predetermined sleeve inside and outside diameters when said first and second ferrules lie respectively in said first and second sleeve portions and in precise alignment;

said front shoulder of said hood has a smallest diameter that is greater than said predetermined sleeve inside diameter but less than said predetermined sleeve outside diameter.

6. The apparatus described in claim 1 wherein;

said hood has a tubular forward portion that surrounds said sleeve front portion and has a radially-inwardly extending hood flange that lies forward of said sleeve, said housing passage has a front portion with side passage walls that surround said hood front portion and with a radially-inwardly extending housing flange that lie forward of said hood;

said hood tubular forward portion lies loosely within said housing passage side walls with the clearance between them being at least equal to the clearance between said hood and said sleeve front portion.

7. The apparatus described in claim 1 including;

a first ferrule of predetermined outside diameter lying in said sleeve, said sleeve having a length that is no more than 3 times said ferrule outside diameter, whereby to minimize sleeve expansion in the event of misalignment of a mating second ferrule that is inserted into said sleeve front portion.

8. A fiber optic connector apparatus comprising;

socket and pin connectors that have respective pin and socket housings, with said pin and socket housings having pin and socket housing passages, respectively, said connectors being mated and said passages extending along an axis;

said socket passage having front and rear portions, said socket connector having a rear socket body lying at a substantially fixed portion in said socket passage rear portion, said socket connector having an alignment assembly lying in said passage front portion and being axially slidable therein, and said socket connector having a spring with front and rear ends coupled respectively to said rear body and to said alignment assembly and urging said alignment assembly to slide forwardly;

said alignment assembly including a sleeve that has forward and rearward portions and that has a gap that allows the sleeve to expand, and a hood assembly that includes a hood which surrounds said sleeve and which has front and rear shoulders for limiting axial movement of said sleeve relative to said hood;

a socket ferrule which lies tightly in said sleeve rear portion and which has a socket fiber conduit extending parallel to said axis, and a first optical cable that has an optical fiber which extends substantially through said socket fiber conduit and that has a rear cable portion extending rearwardly through said socket body and out of said socket passage;

said pin connector has a pin ferrule that projects into said socket passage and into said sleeve forward portion and that lies in alignment with said socket ferrule, said pin ferrule having a pin fiber conduit, and including a second optical cable that has an optical fiber which extends substantially through said pin fiber conduit and that has a front cable portion extending forwardly through said pin body and out of said pin housing passage;

said hood having a tubular part that surrounds said sleeve and a forward end that forms said front shoulder, with said forward end forming a hood flange that projects radially inwardly from said tubular part, said flange having an inner diameter which is greater than the inner diameter of said sleeve but which is smaller than the outer diameter of said sleeve when said ferrules lie in said sleeve.

9. The apparatus described in claim 8 wherein;

said hood has a front end with an outside diameter;

said socket housing passage has a front end with a radially-inwardly projecting housing flange, said housing flange having an inside diameter which is less than the outside diameter of said hood front end but greater than the inner diameter of said hood flange.

10. The apparatus described in claim 8 wherein;

said hood tubular part has a front portion;

said sleeve is formed of sheet metal with substantially a first thickness;

said hood tubular part has a front portion with an inside diameter that is greater than the outside diameter of said sleeve forward portion, by at least the thickness of said sheet metal of said sleeve.

11. Fiber optic connector apparatus comprising:

a terminus that includes an alignment assembly, said alignment assembly including a ferrule-receiving sleeve which has a rear portion for holding a first ferrule and a front portion for receiving a mating second ferrule, said alignment assembly including a hood that surrounds said sleeve and that forms at least a front shoulder that limits forward movement of the sleeve with respect to the hood, and said alignment assembly including a body lying primarily rearward of said hood;

said body having a front end and said hood having a rear end that is engaged with said body front end in a connection that resists removal of said hood and prevents tilt of said hood relative to said body, while allowing removal of said hood from said body.

12. The apparatus described in claim 11 wherein:

said body front end and said hood rear end are threadably engaged.

13. The apparatus described in claim 11 including:

an optical cable assembly which has a front portion fixed to said body and which has an optical fiber extending through said first ferrule, with said first ferrule being fixed to said body, said ferrule being removable from said sleeve and hood by sliding said ferrule rearwardly therefrom, so said hood and sleeve can be removed from said body.

14. The apparatus described in claim 11 wherein:

said hood includes a front hood piece forming said front shoulder and a rear hood piece forming said hood threaded rear, said front hood piece being slidably engaged with said rear hood piece.

15. Fiber optic connector apparatus comprising:

a housing having a least one passage with an axis and with front and rear passage portions;

a socket terminus that includes an alignment assembly lying primarily in said passage;

said alignment assembly including a ferrule-receiving sleeve which has a rear portion for holding a first ferrule and a front portion that is expandable in diameter to receive a mating second ferrule, wherein each of said ferrules has a predetermined outside diameter, said alignment assembly including a hood that surrounds said sleeve and that forms front and rear shoulders that limit forward and rearward movement of the sleeve with respect to the hood;

said hood loosely surrounding said sleeve front portion to allow sleeve tilt by at least 4° with respect to said hood when both of said ferrules are installed in alignment in said sleeve.

16. The apparatus described in claim 15 wherein:

said hood has a radially-inwardly projecting front flange with an inside diameter that is greater than the inside diameter of said sleeve front end but that is less than the outside diameter of said sleeve front end, when both of said ferrules are installed in alignment in said sleeve.

17. A method for disassembling a fiber optic connector apparatus which includes a connector housing with a passage and an alignment assembly lying in said passage, wherein said alignment assembly includes a body, a hood attached to said body, and a sleeve lying in said hood, wherein said connector apparatus includes a ferrule that has a conduit and that lies in said sleeve, and said connector apparatus includes an optical cable extending through said body and having an optical fiber extending through said ferrule conduit, with said ferrule being rigidly fixed to said body, comprising:

removing said alignment assembly, cable and ferrule as a unit from said passage, and unscrewing said hood from said body while said optical cable and ferrule remain rigidly fixed to said body.

* * * * *